US009624966B1

(12) United States Patent
Obleman et al.

(10) Patent No.: US 9,624,966 B1
(45) Date of Patent: Apr. 18, 2017

(54) FLOATING CLEVIS MECHANISM

(71) Applicant: Lockheed Martin Corporation, Bethesda, MD (US)

(72) Inventors: Michael R. Obleman, Cicero, NY (US); Blake A. Carnahan, Manlius, NY (US); Michael James Avery, Liverpool, NY (US); Todd Charles Gloo, Manlius, NY (US)

(73) Assignee: Lockheed Martin Corporation, Bethesda, MD (US)

(*) Notice: Subject to any disclaimer, the term of this patent is extended or adjusted under 35 U.S.C. 154(b) by 501 days.

(21) Appl. No.: 14/136,882

(22) Filed: Dec. 20, 2013

Related U.S. Application Data

(60) Provisional application No. 61/772,672, filed on Mar. 5, 2013.

(51) Int. Cl.
*F16C 11/04* (2006.01)

(52) U.S. Cl.
CPC ....... *F16C 11/04* (2013.01); *Y10T 403/32221* (2015.01)

(58) Field of Classification Search
CPC ..... Y10T 403/32221; Y10T 403/32918; Y10T 403/32073; Y10T 403/32868; Y10T 403/32557; Y10T 403/32254; F16C 11/045; F16C 11/0614; F16C 11/04; F16C 11/06
USPC ............................................. 403/61, 79, 157
See application file for complete search history.

(56) References Cited

U.S. PATENT DOCUMENTS 1,030,527 A * 6/1912 Nelson .................... F16G 15/06 278/96
2,121,572 A * 6/1938 Polden ..................... G02C 5/22 16/228
2,331,806 A * 10/1943 Shakespeare ................. 172/677
2,499,030 A * 2/1950 Moon ........................ F16D 3/38 403/58
2,743,895 A * 5/1956 Tygh .................... A47D 13/105 248/341
3,380,759 A * 4/1968 Engelmann .......... A01B 59/002 280/474
3,697,031 A * 10/1972 Glickman .............. F16M 11/28 248/171
4,368,997 A * 1/1983 Shemtov ................... F16B 7/04 248/286.1
4,806,042 A * 2/1989 Swank ...................... F16B 3/00 403/101

(Continued)

*Primary Examiner* — James Ference
(74) *Attorney, Agent, or Firm* — Howard IP Law Group, PC

(57) ABSTRACT

A mechanical joint is provided comprising a bracket having a first elongated opening formed therein. An alignment guide comprising a second elongated opening formed therein is configured to rotatably attach to the bracket and is moveable between a first, floating position, and a second, non-floating position. In the first position the first elongated opening of the bracket and the second elongated opening of the alignment guide are axially aligned with one another and define a single elongated opening. In the second position the first elongated opening of the bracket and the second elongated opening of the alignment guide are partially aligned with one another and define a generally circular opening. The alignment guide is configured to slideably attach to a moveable end of a linear actuator.

17 Claims, 12 Drawing Sheets

(56) References Cited

U.S. PATENT DOCUMENTS

| | | | | |
|---|---|---|---|---|
| 4,917,526 | A * | 4/1990 | Paterson | B64D 1/04 403/113 |
| 5,674,027 | A * | 10/1997 | Warnaar | F16C 11/045 16/297 |
| 5,791,809 | A * | 8/1998 | Bessey | E02F 3/58 403/157 |
| 5,865,557 | A * | 2/1999 | Kasim | E02F 3/58 403/157 |
| 5,971,651 | A * | 10/1999 | Gornick | F16C 11/045 403/14 |
| 6,109,814 | A * | 8/2000 | Cox | F16B 21/09 172/450 |
| 6,350,074 | B1 * | 2/2002 | Borges | F16C 11/0614 403/158 |
| 6,675,546 | B2 * | 1/2004 | Coles | F16C 11/045 403/157 |
| 6,902,341 | B1 * | 6/2005 | Rauschert | F16C 7/02 403/301 |
| 7,162,968 | B2 * | 1/2007 | Thompson | B63B 17/02 114/361 |
| 7,753,612 | B2 * | 7/2010 | Bouru | F16C 11/045 403/123 |
| 7,788,993 | B2 | 9/2010 | Wood | |
| 2009/0218777 | A1 * | 9/2009 | Wood | B64C 1/06 280/93.51 |
| 2009/0273153 | A1 * | 11/2009 | Nashawaty | B60G 7/001 280/124.122 |
| 2011/0297201 | A1 * | 12/2011 | Chen | E04H 15/42 135/144 |

* cited by examiner

REPLACEMENT SHEET

8/12

FLOATING CLEVIS MECHANISM

CROSS-REFERENCE TO RELATED APPLICATION

This application claims the benefit of U.S. Provisional Patent Application No. 61/772,672, filed Mar. 5, 2013, the entire disclosure of which is incorporated by reference herein for all purposes.

FIELD OF THE INVENTION

The present disclosure relates generally to mechanical joints, and more specifically, to a floating clevis joint for use with a linear actuator.

BACKGROUND

Antennas and other sensors used in radar systems for example, typically utilize a large area antenna array (e.g. a radio frequency beam scanning array) mounted on a rotating platform to revolve the antenna in the azimuth direction. These rotatable platforms allow the array to be oriented at a particular azimuth angle, or to sweep through an entire range of azimuth angles at a predetermined angular rate. In traditional rotating radar systems, one end of the array is pivotally mounted to the rotating platform, forming a cantilevered arrangement in which the array may be, for example, oriented in a stowed or transport position, or oriented at a target elevation angle by means of one or more actuators.

The actuators used to elevate these types of antenna arrays may comprise linear ball screw actuators driven by electric motors. While accurate in operation, one disadvantage of this type of actuator results from the inability to "float" (or unload) the actuator when in the stowed or transport position, as is conventionally achievable with other linear actuator types, such as linear hydraulic actuators. As a result, the load paths of the antenna structure become statically indeterminate and otherwise difficult to evaluate, adding a level of uncertainly to the design of the structure.

Referring generally to FIG. 1, a scanning antenna array system 10 is shown, including a base 11 and an antenna array 12 pivotally mounted to a rotating pedestal 15 about pivot point 14. The elevation angle of array 12 may be altered via linear actuator 18 pivotally connected to array 12 at pivot point 19, and to pedestal 15 at pivot point 16. As shown, system 10 is in a stowed or transport position, wherein the inability to float actuator 18 results in statically indeterminate load paths (three fixed points illustrated). The inability to accurately calculate potential loads on the array and support structure is currently addressed by adding additional structural elements to provide added support to the system. This potentially excessive strengthening increases system weight, as well as requires the use of additional sensors, interlocks and software to more closely monitor actuator position and performance.

Improved systems and methods are desired.

SUMMARY

In one embodiment of the present disclosure, a mechanical joint is provided. The joint comprises a bracket having a first elongated opening formed therein. An alignment guide comprising a second elongated opening formed therein is configured to rotatably attach to the bracket and is moveable between a first, floating position, and a second, non-floating position. In the first position the first elongated opening of the bracket and the second elongated opening of the alignment guide are aligned along their respective axes and define an elongated opening. In the second position the first elongated opening of the bracket and the second elongated opening of the alignment guide are partially aligned with one another and define a generally circular opening. The alignment guide is configured to slideably attach to a moveable end of a linear actuator.

DETAILED DESCRIPTION OF PREFERRED EMBODIMENTS

Figure 1:
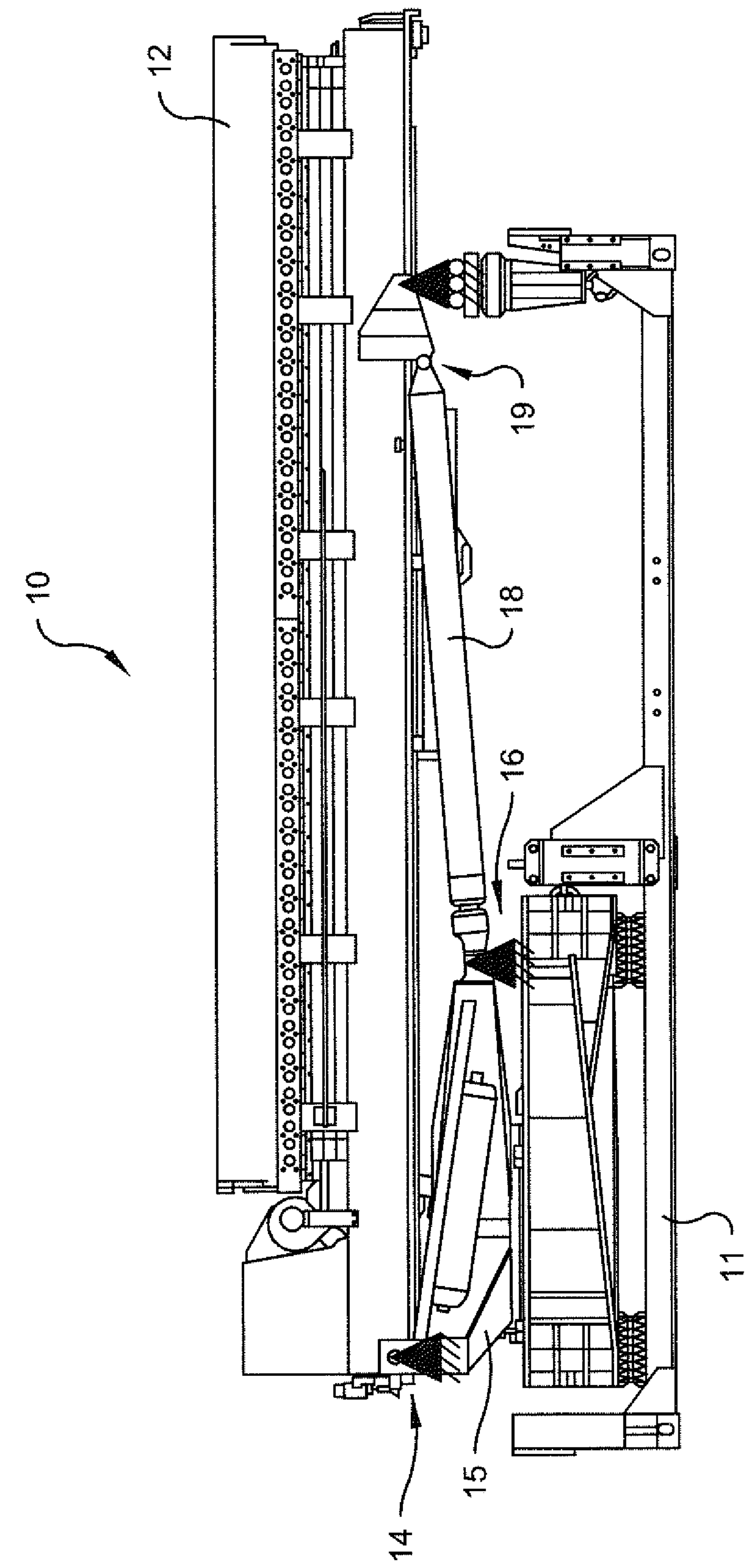
Fig. 1 (Prior Art)
FIG. 1 is a simplified schematic diagram illustrating a cantilevered antenna array according to the prior art in a closed or transport position.

It is to be understood that the figures and descriptions of the present invention have been simplified to illustrate elements that are relevant for a clear understanding of the present invention, while eliminating, for purposes of clarity, many other elements found in typical rotating radar array systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure include a mechanical joint operable in both a floating and a non-floating mode. In one embodiment the joint comprises a bracket defined by at least one protrusion or protruding surface extending from a base. The protrusion defines a first elongated (e.g. slot-like) opening formed therein. The joint further includes an alignment guide configured to attach to the bracket. The alignment guide comprises a second elongated opening defined therein and is configured to rotatably attach to the at least one protrusion via, for example, a pin arranged through the first and second elongated openings. The alignment guide is rotatable with respect to the bracket about a first axis between a first or floating position, and a second or non-floating position. In the first position, the first elongated opening of the bracket and the second elongated opening of the alignment guide are aligned along their axes with one another so as to define a single elongated opening. In the first position, the pin arranged through the aligned elongated openings of the bracket and the alignment guide is able to float, or move freely along the length of the elongated opening(s). In the second position, the first elongated opening of the bracket and the second elongated opening of the alignment guide are not aligned with one another. Rather, the first and second elongated openings only partially overlap, defining, for example, a common circular (i.e. not elongated) opening or aperture through each of the first and second openings having a center aligned with the first axis. In this way, in the second position, the pin arranged through the first and second openings is constrained radially, corresponding to a non-floating mode of operation.

Figure 3:
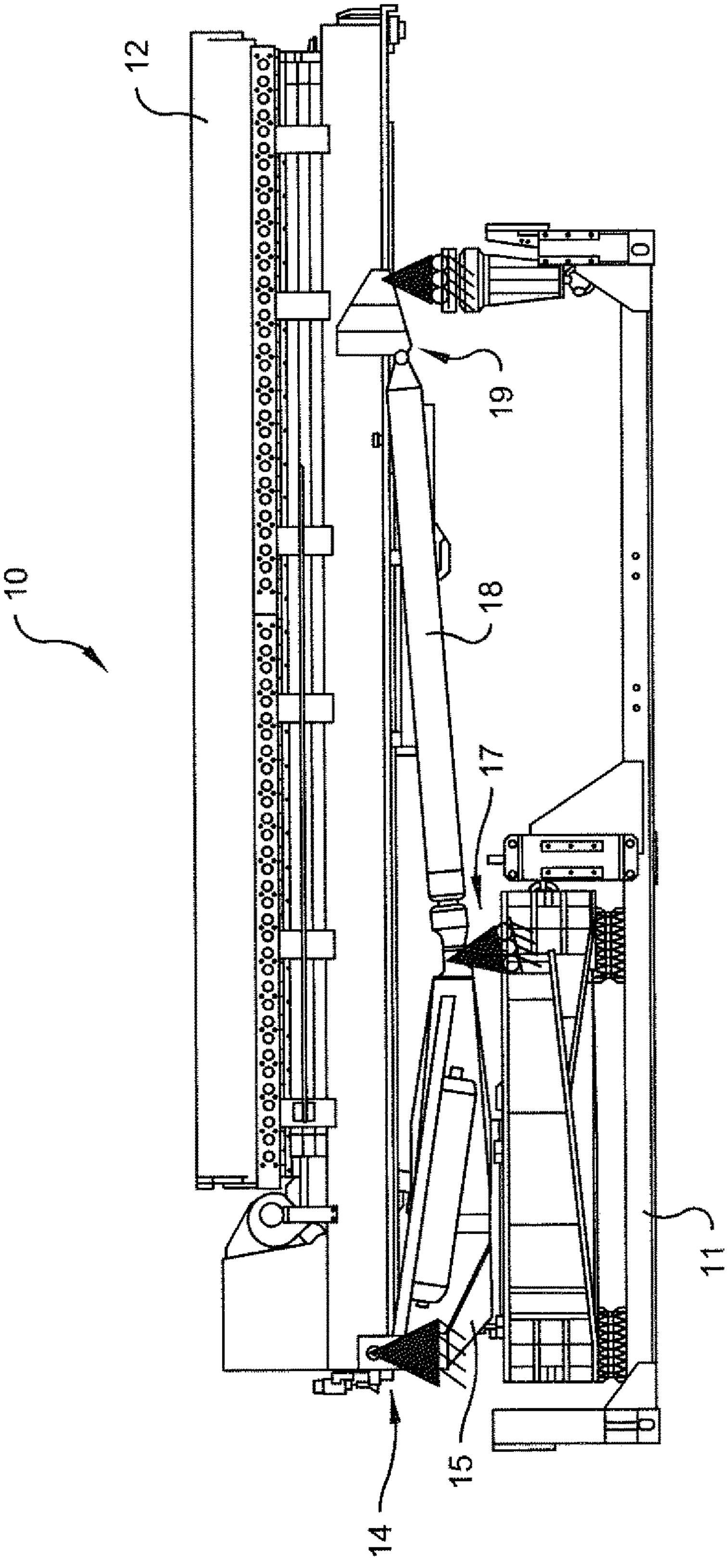
FIG. 3 is a simplified schematic diagram illustrating a cantilevered antenna array according to an embodiment of the present disclosure in a closed or transport position.

With reference to FIGS. 1 and 3, one application of an embodiment of the present disclosure is configured for use with radar array systems (e.g. as described above), wherein a traditional, non-floatable, rotating mechanical joint 16 (FIG. 1), such as a traditional pivoting joint, has been replaced with a floatable, rotating mechanical joint 17 (FIG. 3) according to an embodiment of the present disclosure. This arrangement mitigates and/or eliminates the above-described problems associated with statically indeterminate systems, and the risks of excessive loads placed on actuator 18 during transport of antenna array system 10.

Figure 4A:
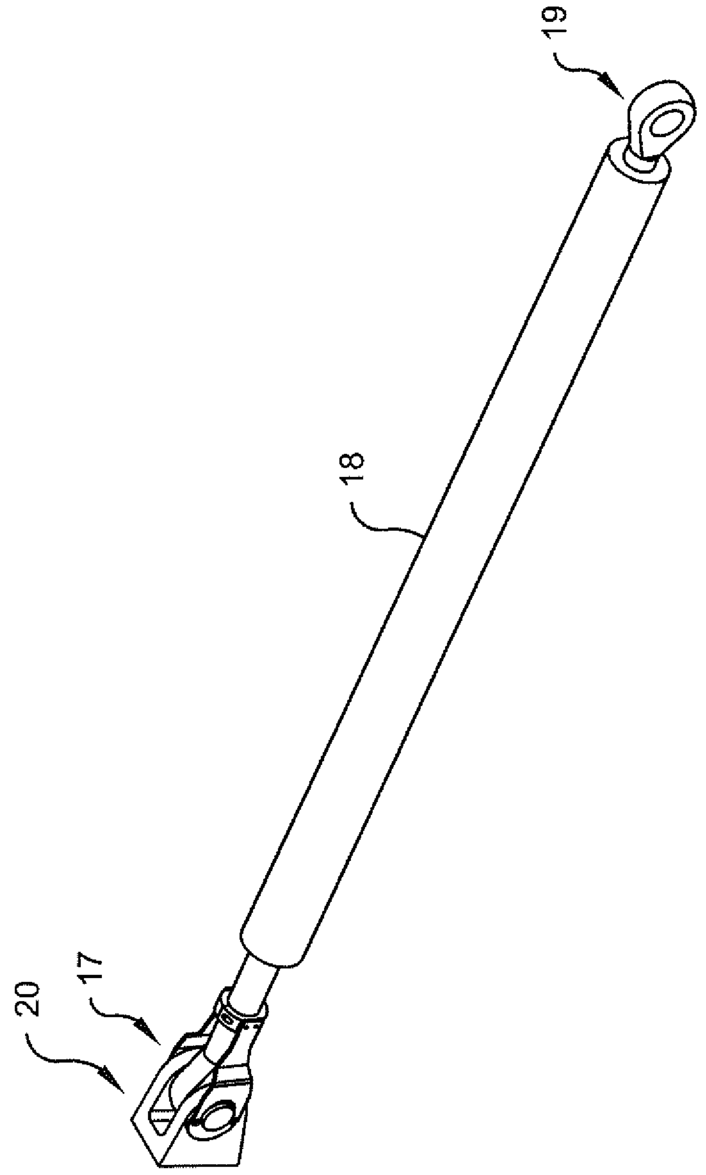
FIG. 4A is a perspective view of an actuator and joint assembly according to an embodiment of the present disclosure.
Figure 4B:
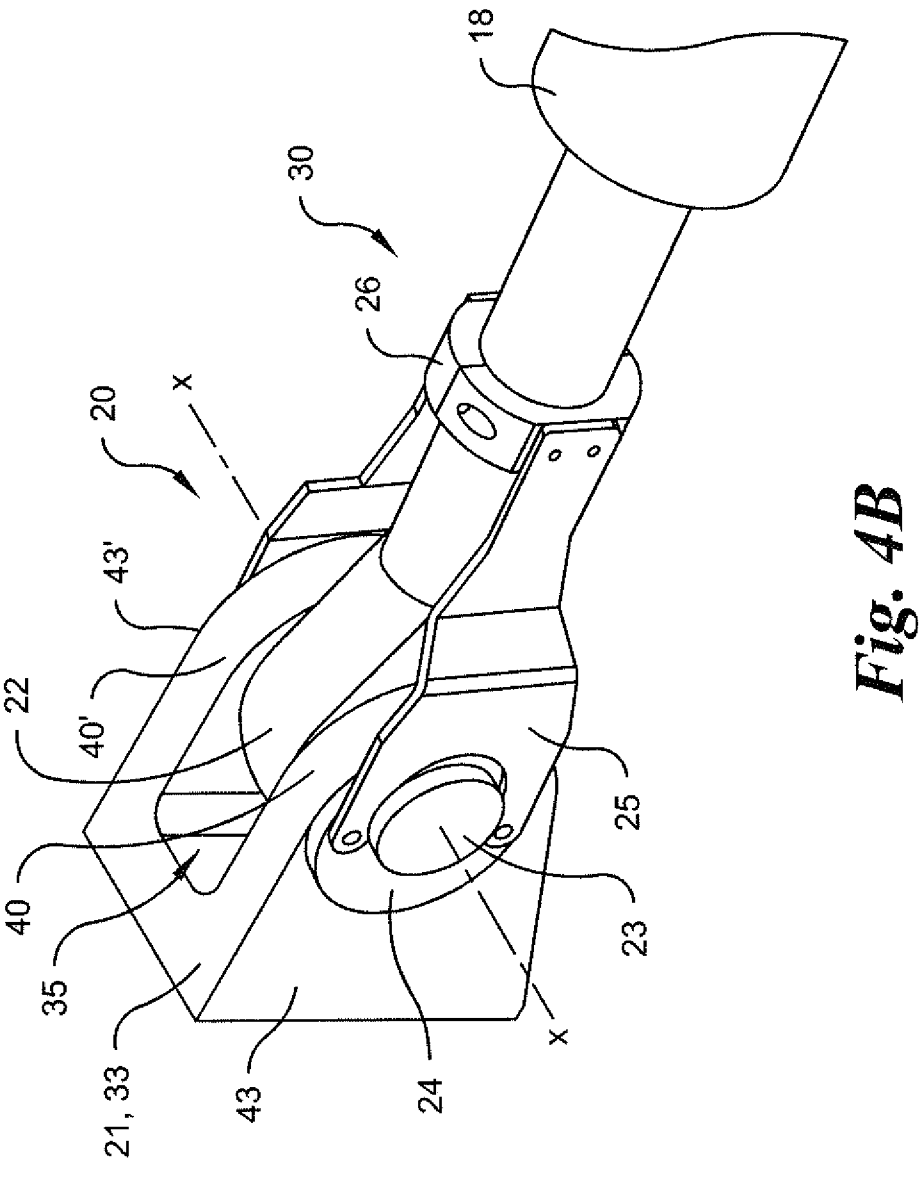
FIG. 4B is a perspective view of the joint assembly of FIG. 4A.
Figure 4C:
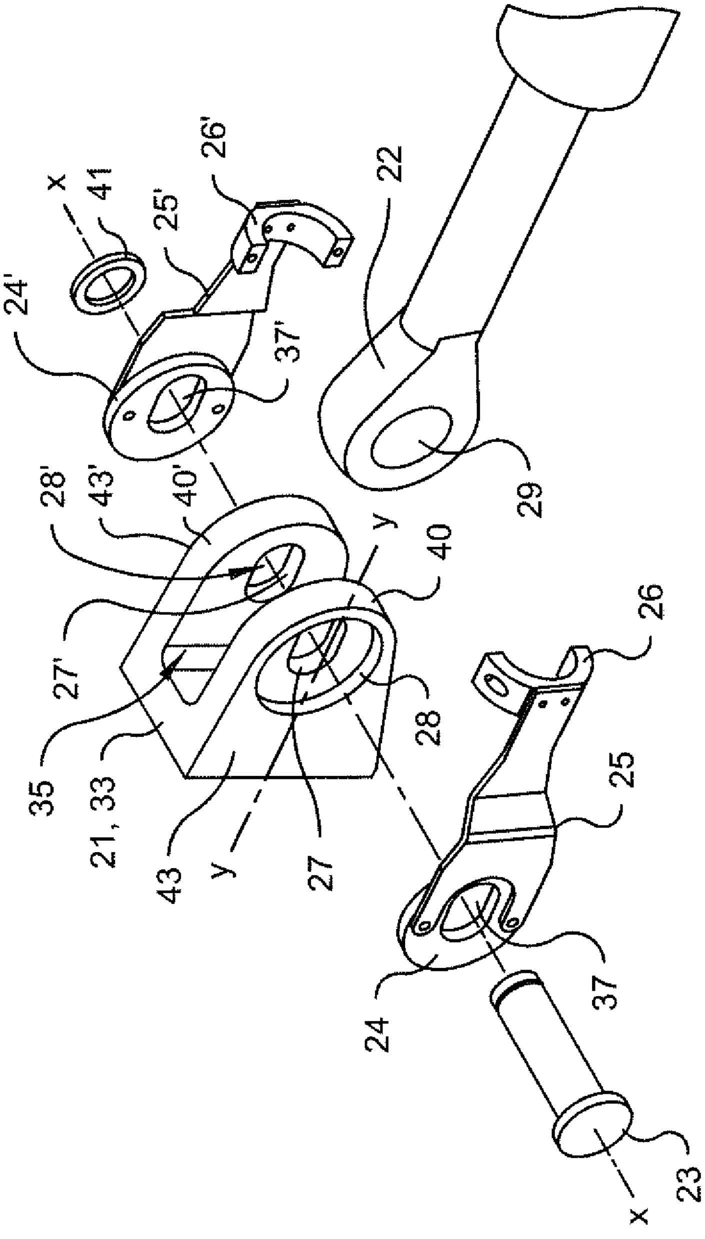
FIG. 4C is an exploded perspective view of the joint assembly of FIG. 4A.

Referring generally to FIGS. 4A-4C, embodiments of the present disclosure will be described in further detail. As illustrated in FIG. 4A, a mechanical joint assembly 20 according to the present disclosure is provided, and configured to attach to, for example, a first moveable end of a linear actuator 18 (e.g. a ball screw actuator). As shown above with respect to FIG. 3, actuator 18 may be utilized in an antenna array system, wherein joint assembly 20 forms the illustrated mechanical joint 17 for attaching a first end of actuator 18 to rotating pedestal 15. By way of non-limiting example only, a traditional rod end (i.e. a heim joint), or other pivotable connection fixed to a second end of actuator 18 may form pivoting joint 19.

With reference to FIGS. 4B and 4C, joint assembly 20 includes a clevis bracket 21 having an elongated opening (e.g. a slot-like opening) 27 formed therethrough. Clevis bracket 21 includes a base 33 and a pair of side arms or first and second protrusions 40,40' extending perpendicularly from base 33 generally parallel to one another so as to define a slot-like opening or void 35. Opening 35 is configured to accept, by way of non-limiting example only, a pivotable mechanical connection such as a rod end or heim joint 22 attached to the first moveable end of actuator 18. Each protrusion 40,40' defines a respective elongated or slot-like openings 27,27' extending in a direct of an axis y. Rod end 22 comprises a through hole 29, and may be captured between protrusions 40,40' of clevis bracket 21 via a clevis pin 23 arranged co-axially through elongated openings 27,27' and through hole 29.

Figure 7:
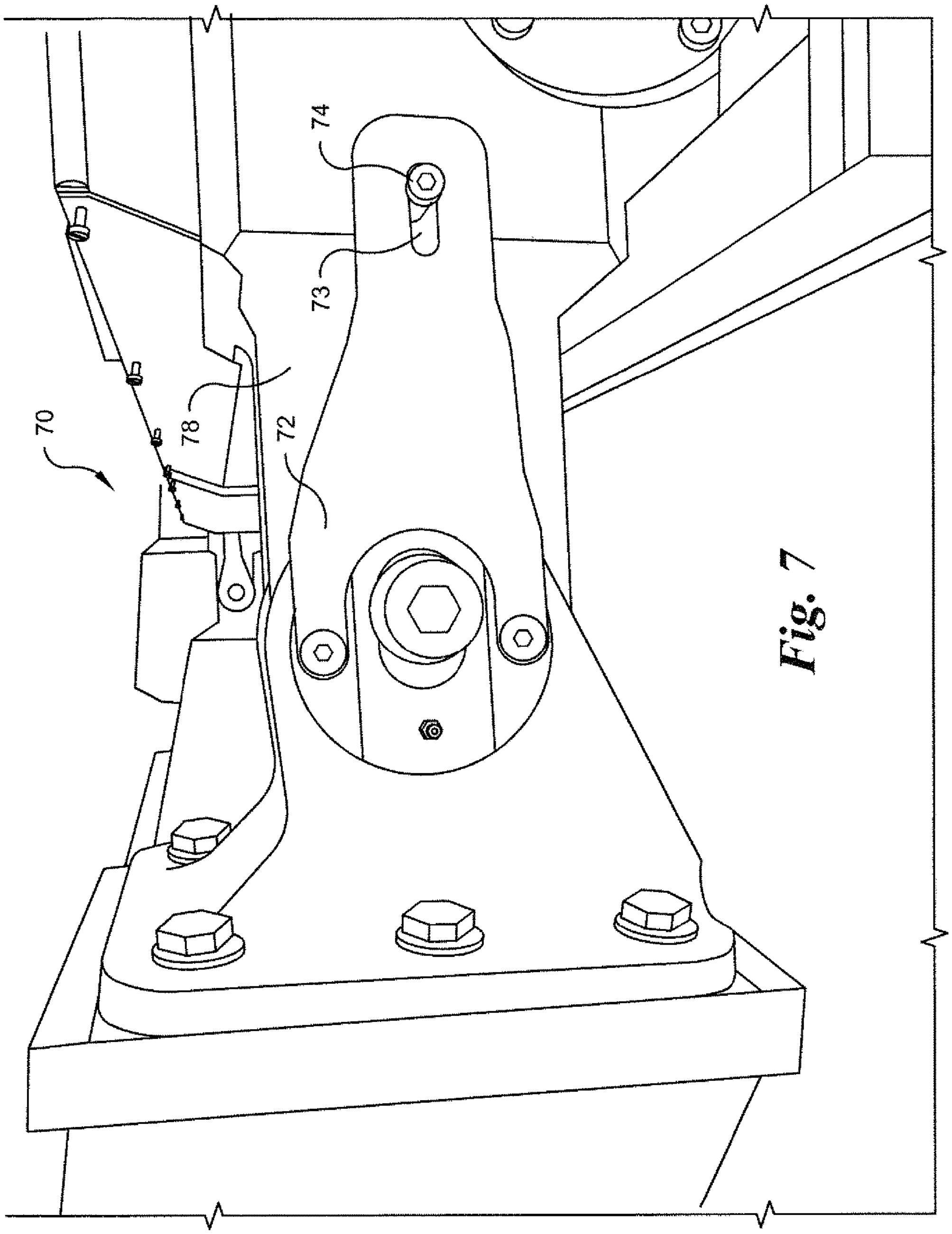
FIG. 7 is a side perspective view of a joint assembly according to another embodiment of the present disclosure.

Joint assembly 20 further comprises an alignment guide 30 fitted to the first end of actuator 18 or fitted to rod end 22. Alignment guide 30 comprises two extension members 25,25' each having a respective locking disc 24,24' attached to a first end thereof, and a respective collar half 26,26' attached to a second end thereof. In the exemplary illustrated embodiment, alignment guide 30 is formed from two subassemblies (FIG. 4C), with each subassembly comprising one-half of alignment guide 30 (e.g. each subassembly comprising a respective extension member 25,25', locking disc 24,24', and collar half 26,26'). Securing collar halves 26,26' to one another about a portion of actuator 18 or rod end 22 creates a collar-like attachment (FIG. 4B). This attachment may form a slideable connection between alignment guide 30 and actuator 18 or rod end 22. More specifically, once slidably attached to a portion of actuator 18 or rod end 22, alignment guide 30 may remain moveable along the axial direction of actuator 18 (i.e. the direction of linear extension/retraction of the actuator, see FIG. 5A). While a collar-like attachment is shown, it is envisioned that the slideable connection between an actuator and an alignment guide may be formed by any other suitable arrangement. For example, referring generally to FIG. 7, an alternate joint assembly 70 is shown. As illustrated, the above-described slideable connection between a moveable actuator 78 and an alignment guide 72 may be formed via a pin(s) or fastener(s) 74 inserted through slot-like opening(s) 73 formed through alignment guide 72, and attached to actuator 78.

Figure 6:
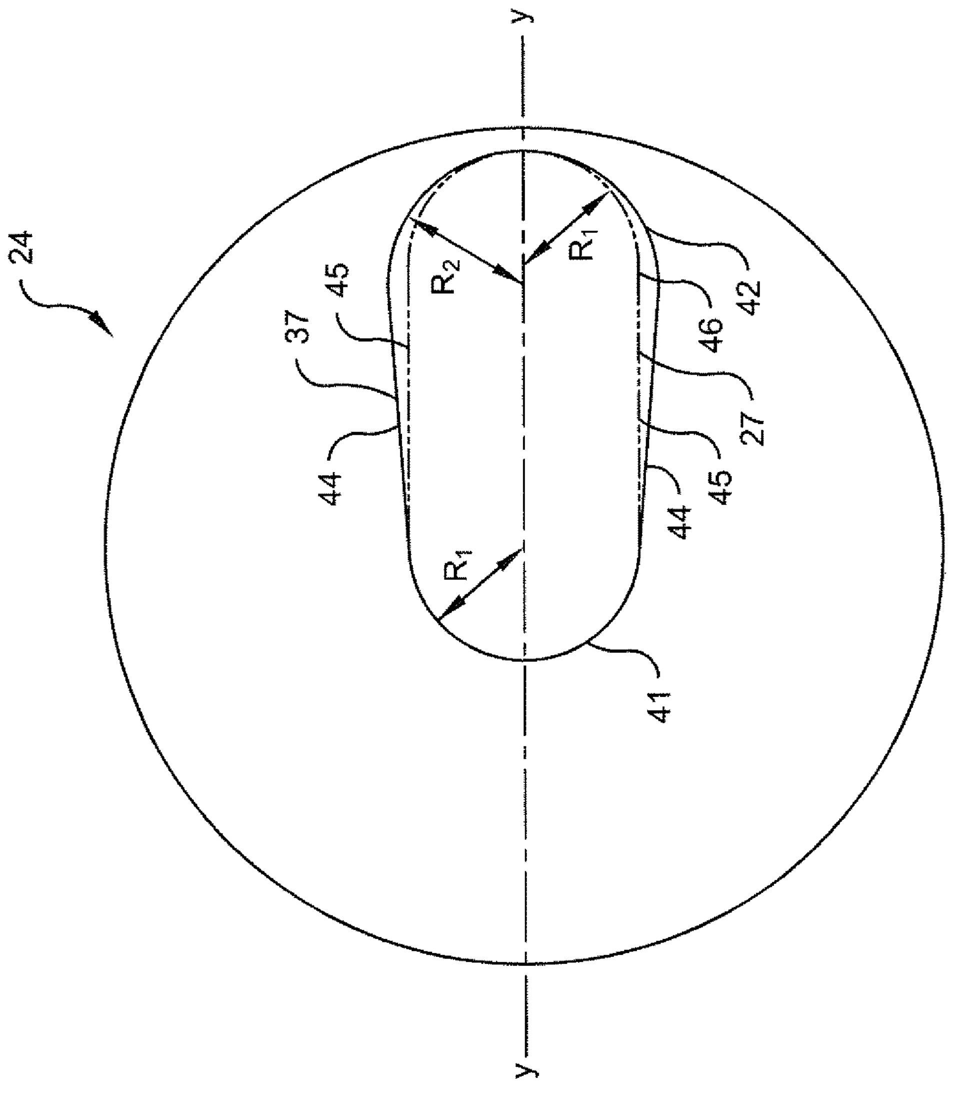
FIG. 6 is a side perspective view of a locking disk according to an embodiment of the present disclosure.

Each locking disc 24,24' may comprise a substantially cylindrical or disc-like profile and define elongated openings 37,37'. Referring generally to FIG. 6, each elongated opening 37,37' of locking discs 24,24' (one locking disc 24 shown in FIG. 6) is defined as extending along an axis (e.g. axis y, as illustrated), and may comprise a multi-radius or varying-width profile. More specifically, a first end of elongated opening 37 may be defined by a first curved profile 41 of a first radius $R_1$, while a second end may be defined by a second curved profile 42 of a second radius $R_2$, wherein second radius $R_2$ is larger than first radius $R_1$. Substantially linear segments 44 connect curved profiles 41,42 so as to define elongated opening 37. As illustrated, in one embodiment, first curved profile 41 may correspond in size to elongated openings 27,27' of clevis bracket 21, which may comprise constant-width profiles. More specifically, elongated openings 27,27' may be defined on first and second ends by first and second curved profiles 41,46 of first radius $R_1$, joined by linear segments 45. In other embodiments, elongated openings 37,37' may correspond in size and shape to elongated openings 27,27' of clevis bracket 21.

Referring again to FIGS. 4B and 4C, when the joint is assembled, locking discs 24,24' are configured to engage with corresponding recesses 28,28' formed in outward-facing surfaces 43,43' of each protrusion 40,40' of clevis bracket 21. Recesses 28,28' comprise a complementary circular profile with respect to locking discs 24,24', and extend from outward-facing surfaces 43,43' of each protrusion 40,40', to a first depth located partially through the thickness of each protrusion 40,40'. As illustrated, elongated openings 27,27' extend from this first depth, through a remainder of the thickness of each protrusion 40,40'. This arrangement radially constrains locking discs 24,24' within recesses 28,28'. Locking discs 24,24' remain rotatable within recesses 28,28' about a first axis x. Clevis pin 23 may be inserted through each of openings 37,37', aperture 29 of rod end 22, and openings 27,27' to form the assembled joint illustrated in FIG. 4B. A locking ring or clip 41 may be secured to an end of clevis pin 23 for securing clevis pin 23 within clevis bracket 21 in a conventional way.

In the illustrated embodiment, locking discs 24,24' and collar halves 26,26' are fixedly attached to respective extension members 25,25'. However, it is envisioned that a locking disc and collar half may be formed as a single unit (i.e. integral) with a respective extension member without departing from the scope of the present invention. Likewise, alignment guide 30 may be formed as a single unit. Further still, the slideable connection between collar halves and, for example, rod end 22 may be replaced with a fixed connection, and a slideable connection may be formed between extension members 25,25', and locking discs 24,24' or collar halves 26,26'. In this way, at least one mechanism to provide linear displacement of rod end 22 with respect to clevis bracket 21 (e.g. in the direction illustrated in FIG. 5A) is maintained. Further, while locking discs 24,24' are configured engage outward-facing recesses 28,28', it should be understood that recesses 28,28' may be formed in inward facing surfaces of protrusions 40,40', and locking discs 24,24' may be configured to rotatably engage with these recesses. In other embodiments, extension members 25,25' may define a recess for receiving a portion of protrusions 40,40' (e.g. disc-like protrusions) for forming the above described radially-fixed, rotatable connection between clevis bracket 21 and alignment guide 30 without departing from the scope of the present disclosure.

Figure 5A:
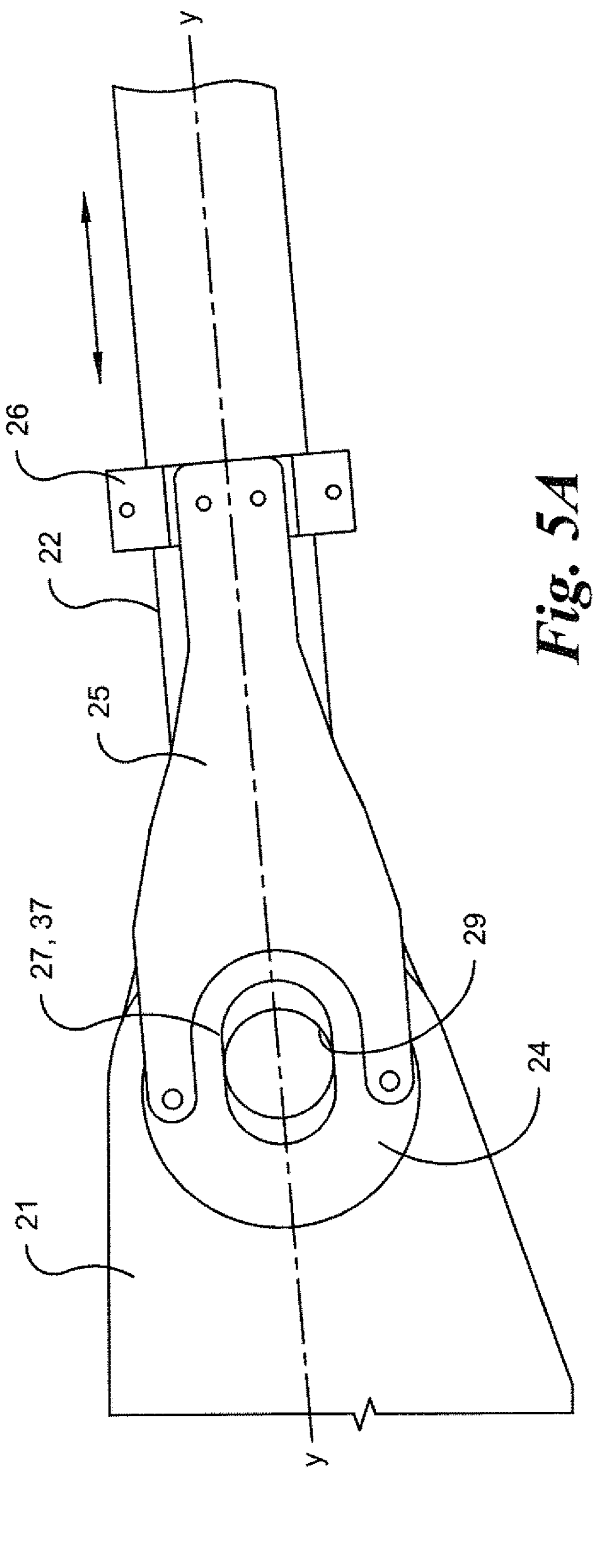
FIGS. 5A and 5B are side views of the joint assembly of FIG. 4A in a floating state of operation.

The floating and non-floating modes of operation of joint assembly 20 are made possible by the operation of alignment guide 30. Specifically, FIG. 5A shows joint assembly 20 in a first position, such as that associated with a stowed or transport position of an antenna array system as illustrated in FIGS. 1 and 3. Clevis pin 23 has been removed from assembly 20 for the purposes of clarity. As shown, elongated openings 27,27' of clevis bracket 21 and the elongated openings 37,37' of locking discs 24,24' are axially aligned along axis y (i.e. the openings align along their lengths). Accordingly, rod end 22 and the first end of actuator 18 (and clevis pin 23, not shown) are free to float within openings 27,27' of clevis bracket 21 (i.e. float in the direction indicated) via the slideable connection to alignment guide 30. In this arrangement, axial load is taken off actuator 18, as well as joint assembly 20, corresponding to the arrangement represented in FIG. 3. Further, in the illustrated position (when actuator 18 is in a fully or partially retracted position), the multi-radius profile of elongated openings of 37,37', as illustrated in FIG. 6, allows for limited rotation and vertical displacement of rod end 22 with respect to clevis bracket 21. This arrangement creates a secondary floating condition, reducing stress on the actuator and preventing binding of the joint.

Figure 5B:
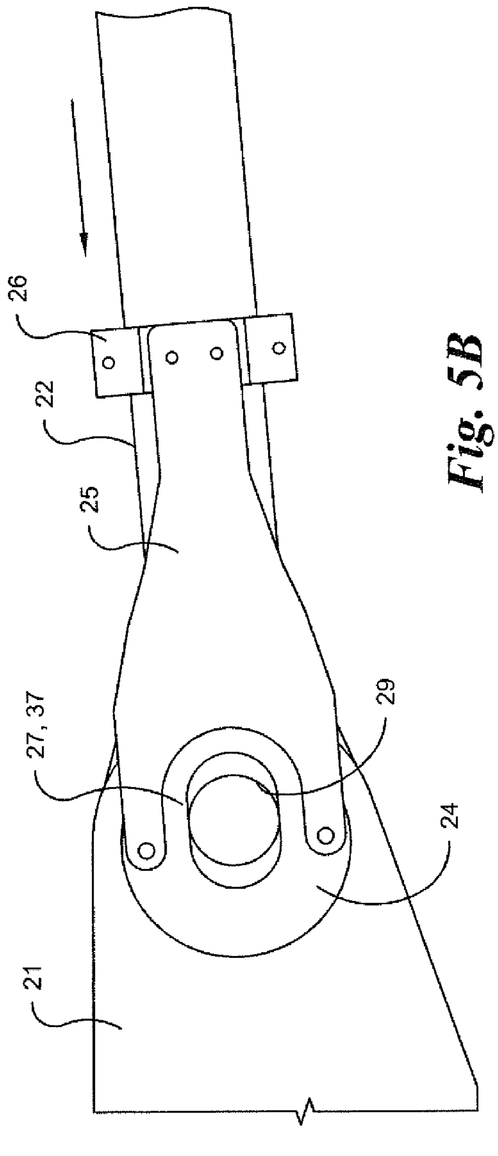

With reference to FIG. 5B, displacing actuator 18 in the direction indicated (as would be associated with the initial raising of array 12 of antenna array system 10) displaces rod end 22 and the clevis pin (not shown) toward an end of the axially-aligned elongated openings 27,27',37,37'. It should be noted that actuator 18 and rod end 22 have moved relative to alignment guide 30, which remains fixed in the axial direction of actuator 18 as locking discs 24,24' are retained within recesses 28,28' of clevis bracket 21.

Figure 2:
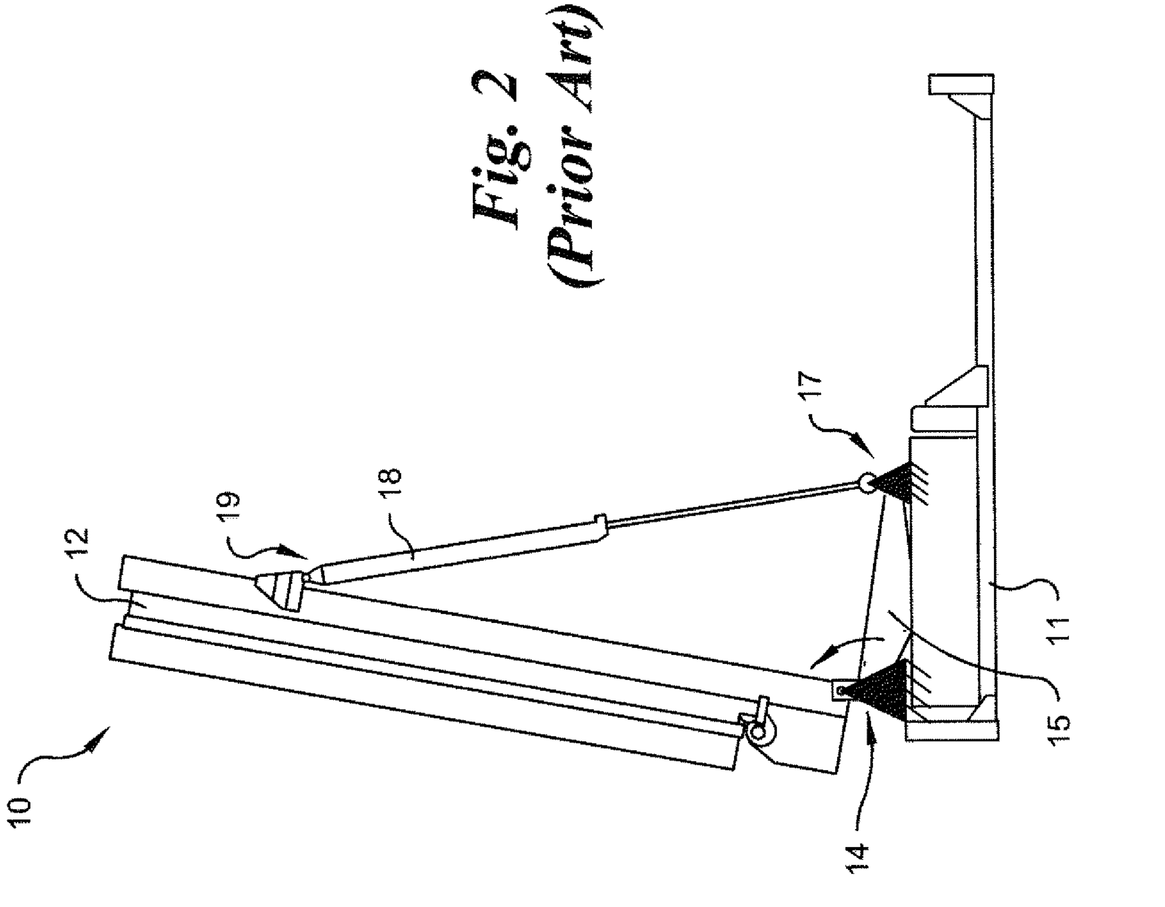
Fig. 2 (Prior Art)
FIG. 2 is a simplified schematic diagram illustrating a cantilevered antenna array of FIG. 1 in an open or deployed position.
Figure 5C:
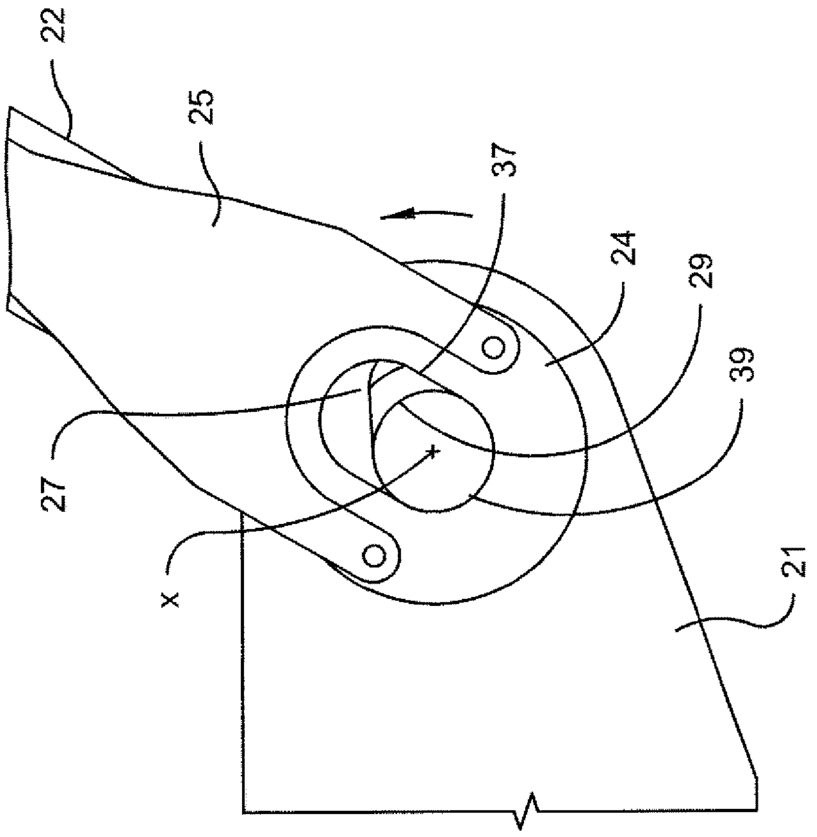
FIGS. 5C and 5D are side views of the joint assembly of FIG. 4A in a non-floating state of operation.
Figure 5D:
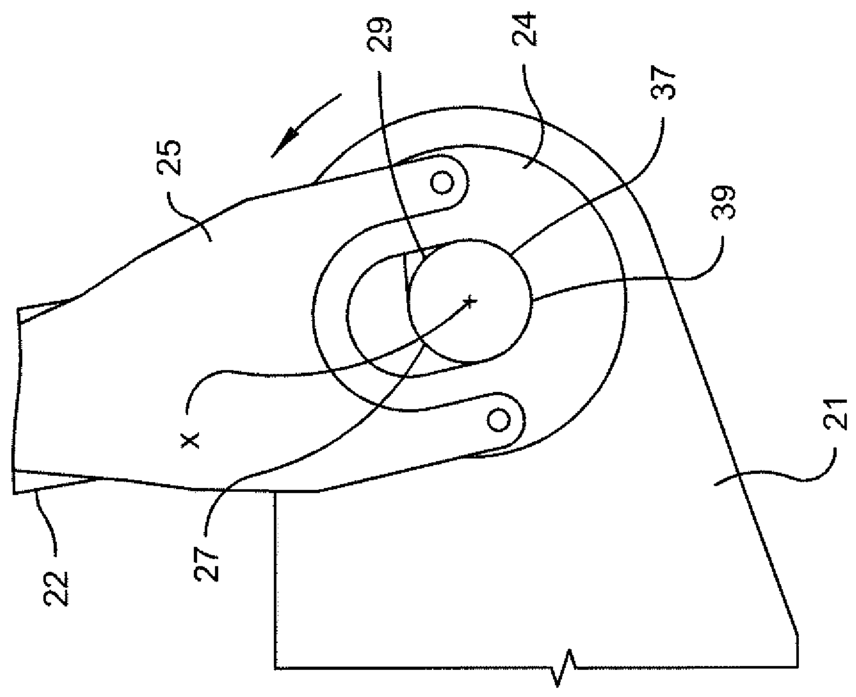

As illustrated in FIG. 5C, as the clevis pin (not shown) abuts an end of elongated openings 27 with its center aligning with first axis x, further extension of actuator 18 causes array 12 to pivot about first axis x, raising array 12 relative to base 11 (FIG. 2). More specifically, further displacement of actuator 18 causes actuator 18 and alignment guide 30 to rotate relative to clevis bracket 21. As alignment guide 30 follows the angular orientation of actuator 18 and rod end 22, elongated openings 37,37' of locking discs 24,24' rotate out of axial-alignment with elongated openings 27,27' of clevis bracket 21, and define a shared generally circular opening 39 having a center about first axis x. The clevis pin is now constrained radially (i.e. in all radial directions) within circular opening 39, however, alignment guide 30 is now free to rotate with respect to clevis bracket 23 about first axis x. Accordingly, joint 20 has been reconfigured from a floating joint, to a non-floating joint by virtue of this misalignment of elongated openings 27,27',37,37'. With respect to FIG. 5D, actuator 18 is shown in a fully-extended position (FIG. 2), wherein joint assembly 20 retains this non-floating mode of operation.

Rotating alignment guide 30 in the reverse direction from that described above (such as by lowering the exemplary array 12 relative to base 11) will act to rotate elongated openings 37,37' of locking discs 24,24' back into axial-alignment with elongated openings 27,27' of clevis bracket 21, and the floating mode of operation will again be realized. As clevis pint 23 is retracted through elongated openings 27,27',37,37', alignment guide 30 and rod end 22 will again be constrained to linear translation, and cannot be rotated significantly with respect to clevis bracket 21.

While embodiments of the present disclosure generally describe a clevis-type arrangement, wherein a rod end or other pivotable mechanical connection is held in double-shear by first and second protrusions, embodiments of the present disclosure may also comprise single-shear attachments. For example, in one embodiment, a bracket may be provided comprising a single protrusion for engaging with an alignment guide comprised substantially of one of the two sides of alignment guide 30 shown in the figures.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term “invention” merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A mechanical joint comprising:

a bracket comprising a first elongated opening formed therein, the first elongated opening extending along a first axis of elongation; and an alignment guide comprising a second elongated opening formed therein the second elongated opening extending along a second axis of elongation, the alignment guide configured to rotatably attach to the bracket, the alignment guide rotatable about an axis of rotation with respect to the bracket between a first floating position, and a second non-floating position;

wherein in the first position the first axis of elongation and the second axis of elongation are aligned with one another and the first elongated opening of the bracket and the second elongated opening of the alignment guide define a single elongated opening, and wherein in the second position the first axis of elongation and the second axis of elongation are not aligned with one another and the first elongated opening of the bracket and the second elongated opening of the alignment guide define an opening coaxially aligned with the axis of rotation.

2. The mechanical joint of claim 1, wherein the alignment guide is configured to slideably attach to a moveable portion of a linear actuator.

3. The mechanical joint of claim 2, wherein the alignment guide comprises a collar for slideably attaching to the moveable portion of the linear actuator.

4. The mechanical joint of claim 2, further comprising a member for engaging with the elongated openings of the alignment guide and the bracket, and the moveable portion of the linear actuator.

5. The mechanical joint of claim 1, wherein the bracket comprises at least one recess formed therein for receiving a portion of the alignment guide.

6. The mechanical joint of claim 5, wherein the recess comprises a circular profile arranged coaxially with the axis of rotation for engaging with a complementary circular profile of the portion of the alignment guide.

7. The mechanical joint of claim of claim 1, wherein angular rotation of the alignment guide with respect to the bracket about the axis of rotation is limited when the joint is moved between the first position and the second position.

8. The mechanical joint of claim 7, wherein the alignment guide is fixed radially with respect to the bracket about the axis of rotation when the joint is in the second position.

9. The mechanical joint of claim 1, wherein the second elongated opening of the alignment guide comprises a multi-radius opening.

10. The mechanical joint of claim 1, wherein the first and second axes of elongation are oriented perpendicularly to the axis of rotation in the first and second positions.

11. The mechanical joint of claim 1, wherein in the first position, a member arranged through the single elongated opening is moveable within the single elongated opening along the first and second axes of elongation, and wherein in the second position, the member is arranged through the opening and is constrained from radial movement within the opening.

12. The mechanical joint of claim 1, wherein the first elongated opening is defined by a circumferential wall of the bracket having a first semicircular wall portion arranged at a first end of the first elongated opening and a second semicircular wall portion arranged at a second end of the first elongated opening, and two wall segments arranged therebetween, wherein the second elongated opening is defined by a circumferential wall of the alignment guide having a third semicircular wall portion arranged at a first end of the second elongated opening and a fourth semicircular wall arranged at a second end of the second elongated opening, and two wall segments arranged therebetween, and wherein in the second position, the first and third semicircular wall portions of the first and second elongated openings are radially aligned so as to define the opening.

13. A mechanical joint comprising:

a bracket comprising a first elongated opening formed therein;

an alignment guide comprising a second elongated opening formed therein and configured to rotatably attach to the bracket, the alignment guide rotatable about an axis with respect to the bracket between a first, floating position, and a second, non-floating position, and configured to slideably attach to a moveable end of a linear actuator; and a pin for engaging with the elongated openings of alignment guide and the bracket, and the moveable end of the linear actuator, wherein in the first position the first elongated opening of the bracket and the second elongated opening of the alignment guide are aligned with one another and define a single elongated opening, wherein in the second position the first elongated opening of the bracket and the second elongated opening of the alignment guide are partially aligned with one another and define an opening aligned with the axis, and wherein the bracket comprises a clevis bracket including two protrusions extending from a base, each protrusion comprising a recess for engaging with the alignment guide, and wherein the first elongated opening comprises an elongated opening formed in each of the protrusions.

14. The mechanical joint of claim 13, wherein the protrusions define a slot formed therebetween, the slot configured to accept the moveable portion of the linear actuator.

15. The mechanical joint of claim 13, wherein the alignment guide comprises a collar for slideably attaching to the moveable end of the linear actuator.

16. The mechanical joint of claim 13, wherein the bracket comprises at least one recess formed therein for receiving a portion of the alignment guide.

17. The mechanical joint of claim 16, wherein the recess comprises a circular profile arranged coaxially with the axis of rotation for engaging with a complementary circular profile of the portion of the alignment guide.

* * * * *